Patented Mar. 9, 1943

2,313,044

UNITED STATES PATENT OFFICE 2,313,044

REDUCTION OF ORES TO METAL

Herman A. Brassert, Rye, N. Y., assignor to Minerals and Metals Corporation, New York, N. Y., a corporation of Delaware No Drawing. Application October 29, 1941, Serial No. 416,990

7 Claims. (Cl. 75—21)

This invention relates to the recovery of metals from their ores and relates mor particularly to the treatment of ores or other compounds of metals which contain two or more oxides or compounds of companion metals of different reducibility, to recover the more easily reduced metal or metals substantially free from the companion metal or metals and, if desired, to recover the companion metal or metals either in the form of oxides or other compounds or in the metallic form.

The present invention accordingly involves the reduction of ores containing oxides or other compounds of two or more companion metals under such temperature conditions that one metal is reduced while the other remains in the form of oxides or other compounds and subsequently, as a separate step carried out in a separate furnace chamber, melting the reduced metal and the unreduced compounds and gangue contained in the ore under conditions non-reducing to these compounds, then removing the unreduced metal or metals with the slag from the metallic bath.

In particular the invention involves the production of iron or steel of commercial quality from iron ores or other iron bearing materials which contain compounds of companion metals such as titanium and/or tungsten, molybdenum, chromium, vanadium, manganese or of other elements which are more difficult to reduce than iron. It also makes possible at least a partial if not complete separation of metals which are more easily reduced than iron, as for instance nickel, which is often contained in iron ores and in chrome-bearing iron ores. The separation of nickel from chrome by this method is complete on account of the wider difference in reducibility of the two metals.

Various metallurgical processes have been suggested for the separation, for example of metals which are more difficult to reduce than iron. Most of these processes involve as a first step after concentration or other beneficiation and to precede separation, simultaneous reduction and melting in the blast furnace or electric melting furnace of the iron ores containing oxides or compounds of such other metals.

Others have suggested as a first step after beneficiation by washing, magnetic concentration, flotation or other physical methods, and before further separation of a melting process, the reduction of such iron ores or compounds to sponge iron by admixture of carbon and heating to temperatures above 900° C. and up to 1400° C. or just below the fusion temperature of the metallic iron.

None of these processes has been satisfactory for the production of substantially pure metallic iron on the one hand and the simultaneous recovery of companion metal oxides or compounds on the other, for the reason that the temperatures involved are so high and the reducing action in the presence of white hot carbon, as for instance in the blast furnace or the electric reduction furnace or that even in the Renn kiln, is so strong that the other compounds present in the ores, although more difficult to reduce than iron, nevertheless are reduced at least in part, and that reduced portion is absorbed by the iron to an extent which renders the finished product useless for most commercial purposes.

I have also found that even if temperatures used in the reduction of, for example, iron ore are in the vicinity of or just below the fusion temperature of iron or anywhere in the range between 900° and 1400° C., where the ore particles soften and sinter or frit together, and, as for instance in a rotary kiln, form agglomerates of sponge iron and slag and under certain conditions may melt at relatively low temperatures within this range, the less readily reducible compounds are nevertheless partially reduced in irregular quantities that are difficult if not impossible of control and thereby contaminate the sponge iron.

On the other hand I have found that a clean separation of such other metals which are more difficult to reduce than iron is possible if reduction precedes melting as a separate step and is carried on at temperatures below the range stated above, but at any rate at temperatures at which no reduction of the other metals takes place, then melting the reduced iron to liquidate iron or steel in a furnace separate from the reduction chamber and removing the other metal oxides or compounds along with the resulting slag for subsequent recovery of their metals, if and as desired.

I found that it is possible to produce iron or steel substantially free from other metals contained in the iron ores, such as for instance titanium, when such ores as the first step after concentration are not melted or heated to the softening point but are first treated with reducing agents at relatively low temperatures, such as, below 900° C. and preferably below 750° C. so that the iron compounds are reduced to metallic iron to a desired degree while the other metal or metals remain unchanged as oxides or other compounds; then as a second and separate step I melt the material so treated. In most instances it will be advisable to compact the material as by briquetting, after the reducing step, so as to provide it in a form more suitable for charging into the melting furnace. The melting process can be carried out in an open hearth furnace or in an electric melting furnace in an oxidizing or neutral atmosphere. The reduced iron particles in the melting become a molten bath of metallic iron and the unreduced oxides or compounds of the other metals form a slag together with the gangue of the ores and fluxes and additions which may have been added to render the slag more liquid or for the purpose of refining the metal bath. The slag is removed from the iron bath and the titanium values or such of other metal compounds contained in the slag may be subsequently recovered by chemical means, for instance as titanium oxide used in the paint industry or as metal in the form of ferro titanium used as an alloying or as a reducing agent in the steel industry.

In the treatment of titaniferous ores and concentrated black sands, for example, I subject them to the action of reducing gases, for example, hydrogen and CO or mixtures thereof, preheated to the range of temperatures in which reduction takes place, or I may heat the reduction retort and its contents to the proper degree. I may add small percentages of carbon to the ores to increase the rate of reduction. Preferably I employ a temperature between 600° and 750° centigrade, a range in which reduction of the iron oxide takes place rapidly although ordinarily not completely and in which agglomeration, fritting, semi-fusion and the sticking of the metallic particles to each other and to the retort walls are avoided.

The ore may be treated in furnaces or retorts of different types, for example, in a vertical or in a rotary kiln type furnace or in a furnace of the horizontal hearth type. Preferably I employ a furnace of the horizontal hearth type in which the bottom is permeable to the gases so that gases may be fed through the bottom and percolated through the ore. The reducing gas fed in this way to the bed of ore has a buoying action giving the ore a consistency resembling fluidity, assuring perfect contact between the ore particles and gases and at the same time causing the bed to flow along the hearth, thus avoiding the necessity of vibrating, shaking, rabbling or other mechanical motion.

Such a treatment of the ore in the temperature range specified will cause most of the iron oxide to be reduced to a metallic iron, while the titanium oxide remains unchanged, because the temperature is purposely maintained lower than that necessary to reduce it.

Immediately following the iron oxide reducing operation and preferably while the mixture of unreduced ore and metal is still hot, the mixture is compacted into briquettes or other forms suitable for charging into an open hearth or electric melting furnace.

The briquettes are melted in the furnace in the usual manner, and in an oxidizing or neutral atmosphere, to avoid reduction of the $TiO_2$ or titanium compounds. The use of a neutral or oxidizing atmosphere during melting, in the absence of large quantities of white hot carbon that exist in the hearth of a blast furnace or an electric reduction furnace, prevents the reduction of the titanium oxide to metallic titanium during melting and thus the titanium oxide will remain in the slag which rises to the top of the molten iron in the furnace.

Suitable additions, in the form of lime or other desirable fluxes may be made in the furnace in order to form a suitable slag. If the $TiO_2$ values are to be recovered, the slag should be drawn off at the point of maximum $TiO_2$ concentration and before adding more lime and other materials for refining the bath, the presence of which would dilute the $TiO_2$ content of the slag. After the $TiO_2$ slag is removed, a second slag is formed by the addition of lime and other fluxes and the heat is finished in the usual manner. The steel may be deoxidized and carburized by ferro-manganese and small quantities of ferro silicon or other agents added in the furnace and/or ladle, in accordance with normal practice.

It may be found desirable to add iron or steel scrap, molten metal or blown metal to the heat in order to better the economy of the process and/or increase the rate of production.

Especially if the titaniferous iron ores contain high percentages of ilmenite, a compound of FeO and $TiO_2$ from which the iron is not reduced at the temperatures I employ, the slag formed contains a high percentage of FeO. I have found that by adding carbon to the bath or adding an excess of carbon to the original ore beyond that consumed in reduction, a large proportion of the unreduced iron oxides in the slag can be reduced to metallic iron for absorption in the bath. It appears that the carbon in the oxidizing atmosphere during melting at the temperature present in the furnace, will not reduce the titanium oxide; in fact tests have shown that slags can be obtained containing up to 50% $TiO_2$ with only a small percentage of FeO (less than 5%) and a steel can result entirely free from titanium.

If an excess of carbon has been added to reduce the iron content of the slag, the carbon content of the bath can again be reduced by the addition of oxides, preferably lump iron ore, to the bath, in accordance with the usual open hearth and electric furnace practice.

A typical example of my process for the production of titanium free steel from titaniferous ores and simultaneously that of a slag, highly enriched with titanium oxides or other titanium compounds, as indicated above, is as follows:

An electric melting furnace was used in melting the charge consisting of

|  | Pounds |
|---|---|
| Sponge iron briquettes made from titaniferous iron sands containing 64.18% Fe and 5.20% $TiO_2$ | 225 |
| Steel punchings | 50 |

To the bath were added

|  | Pounds |
|---|---|
| Petroleum coke | 7.5 |
| Burnt lime | 15 |
| Iron ore | 10.5 |

The following materials were added to the ladle:

|  | Pounds |
|---|---|
| Fe Si (75% Si) | 0.59 |
| Fe Mn (80% Mn) | 1.30 |
| Graphite | .17 |

The chemical analysis of successive samples of metal and slag taken after the charge was molten and up to the time of maximum enrichment of the slag with titanium oxide or other titanium compounds are as follows:

|  | Metal | | Slag | |
| --- | --- | --- | --- | --- |
|  | C | Ti | FeO | TiO$_2$ |
|  | Per cent | Per cent | Per cent | Per cent |
| Sample No. 1 | 0.06 | Nil | 51.3 | 24.8 |
| Sample No. 2 | 0.06 | Nil | 44.3 | 27.5 |
| Sample No. 3 | 0.06 | Nil | 31.3 | 34.5 |
| Sample No. 4 | 0.14 | Nil | 17.3 | 39.0 |
| Sample No. 5 | 0.36 | Nil | 2.7 | 46.9 |
| Sample No. 6 | 0.50 | Nil | 4.9 | 49.2 |

Analysis of the finished steel as per ladle test was:

| C | Mn | Si | Ti |
| --- | --- | --- | --- |
| 0.20 | 0.55 | 0.25 | Nil |

Weight of total iron charged_____ 189 lbs.
Total weight of metal recovered__ 177.5 lbs.
Percent of total iron recovered___ 94
Time from beginning of charge to tap_____ 2 hrs. 25 min.

The metallic iron was, as shown, completely free of titanium and was of good commercial quality. The ingots piped nicely and the chemical analysis was well within commercial specifications.

The high TiO$_2$ slag can be treated by known methods to recover its titanium values as desired.

It is evident that the same procedure can be followed for the separation of chromium oxide from chromium bearing iron ores in order to produce a chromium-free metal. Chromium oxide will remain unreduced and can be run off in the slag from which the chromium can be recovered by reduction at high temperatures in an electric reduction furnace or by electrolytic or chemical methods.

If the chromium bearing iron ores also contain nickel, which is often the case, then the nickel which is more easily reducible than iron, is reduced with the iron at low temperatures prior to melting and is absorbed in the metal bath with the iron; the chromium remaining unreduced. At least a partial recovery of nickel from nickel bearing iron ores is possible by carrying on the reducing step at temperatures so low that the nickel compounds are reduced, yet the greater portion of the iron compounds remain unreduced. These temperatures lie between 450 and 600° C.

If vanadium compounds are present in the ore which are more difficult to reduce than iron oxides, then the vanadium compounds remain unreduced at low temperatures between 600 and 750° C. and are slagged off in the subsequent melting step, allowing the vanadium to be recovered from the slag.

This process applies equally to ores containing tungsten and molybdenum which can be separated from the iron by the same method of reduction at low temperatures to recover the metallic iron, subsequent melting and separation of these minerals in the form of slag and then recovering their values from the slag.

In the case of manganiferous ores, the iron oxides can be reduced to metallic iron by this process without reduction of the manganese oxides to manganese. The briquettes containing reduced iron and the unreduced manganese oxides can be melted for the simultaneous production of steel and a high manganese slag. The manganese may be recovered as ferro-manganese by melting and reducing it in a blast furnace or in an electric furnace.

From the foregoing description of my invention, it will be apparent that the critical factors underlying the process embodying the invention is the reduction of the easily reducible metal, for example, iron at such low temperatures that the less readily reducible metals remain unreduced, and thereafter melting the mixture of reduced metal and unreduced metallic compounds or oxides in a separate melting step, separating the molten metal from the slag which contains the unreduced oxides of the other metals and subsequently recovering the same if and as desired by known methods.

It will be understood that there may be many variations in the type of apparatus used in the treatment of the ores and that several steps of the process can be combined to form one step, for example, the initial reducing and briquetting operations may be combined as a single step of the process and that the proportions of materials charged to the melting furnace and the charging schedule may be varied considerably depending upon the content of the ores and the desired rate of production and the final specifications of the products. Therefore, the example of the process given above should be considered as illustrative only and not as limiting the scope of the following claims.

I claim:
1. A method of producing metals from a mixture of reducible metallic compounds, one of which is more easily reducible than the other metallic compounds, which comprises, subjecting said mixture to the action of a reducing agent at a temperature sufficient to reduce at least partially the more easily reduced material to metal but below that at which any of said other compounds is reducible, subsequently melting the mixture of reduced and unreduced materials to separate the purified metal from the unreduced compounds by slagging the latter off the metal bath, and treating the slag with a reducing agent to reduce said more easily reducible material therein.

2. A method of producing steel from an iron ore containing undesirable metallic compounds which are less easily reduced to metal than iron oxides, which comprises subjecting said ore to the action of a reducing agent at a temperature sufficient to reduce the iron oxides at least partially to metallic iron but insufficient to reduce said undesirable compounds to metal, charging said partially reduced iron oxides and unreduced compounds to a melting furnace, melting to form purified steel and a slag containing the unreduced compounds, and adding carbon to the slag to reduce the iron oxides therein.

3. A method of producing iron from an iron ore containing undesirable metallic oxides which are less easily reduced than iron oxides, which comprises subjecting said ore to the action of a reducing agent at a temperature above about 600° and less than about 900° C. until the iron oxides are at least partially reduced to metallic iron, charging the partially reduced ore to a melting furnace, melting the charge, treating it with fluxes to form a bath of liquid iron substantially free from the other metals and a slag containing the unreduced oxides of the other metals, and adding carbon to the slag to reduce iron oxides therein to metallic iron.

4. In a method of producing steel from ores containing iron oxides and compounds of one or more other metals which are less easily reduced than iron oxides, the steps of subjecting said ore to the action of a reducing agent at a temperature between about 600° and 900° C. until the iron oxides are substantially reduced to metallic iron, charging the so treated ore to a furnace and melting the charge in a non-reducing atmosphere and with carbon in the bath to produce molten iron substantially free from the other metals and a slag containing their unreduced oxides.

5. A method of producing steel from an iron ore containing undesirable metallic oxides which are less easily reduced than iron oxides, which comprises bringing a reducing gas into contact with the ore at a temperature between about 600° C. and about 900° C. until the predominant proportion of the iron oxides is reduced to sponge iron, melting the partially reduced ore in a non-reducing atmosphere to form a purified iron bath and a slag containing the unreduced oxides, adding carbon to the slag to reduce iron oxides therein to metallic iron, separating the slag from the molten iron, and further refining the molten iron to convert it into steel.

6. The method of producing titanium free steel and a highly concentrated titanium slag from ores and sands containing ilmenite, which consists in reducing the magnetic iron oxides contained in these materials to sponge iron at temperatures and under conditions which do not permit the reduction of titanium compounds, melting the iron and the unreduced portion of the material in a melting furnace with the addition of lime, to form a slag with the unreduced titanium compound and the gangue of the ores, adding carbon to the bath to reduce sufficient iron oxide of the ilmenite to iron to effect a substantial concentration of the titanium compound in the slag.

7. The method of producing metals from iron ores containing nickel and chromium compounds, which comprises subjecting said ores to the action of a reducing agent at a temperature below about 600° C. to reduce the nickel compounds and at least part of the iron oxides but not the chromium compounds, melting the mixture of reduced and unreduced materials to separate the purified nickel and iron metals by gravity from the unreduced compounds, the latter being slagged off the metal bath, and treating the slag with a reducing agent to reduce iron oxides in the slag and to effect a substantial concentration of the chromium compounds in the slag.

HERMAN A. BRASSERT.